(12) United States Patent
Eckstine et al.

(10) Patent No.: US 6,380,849 B1
(45) Date of Patent: Apr. 30, 2002

(54) AERIAL WORK PLATFORM WITH POTHOLE AND/OR OBSTACLE DETECTION AND AVOIDANCE SYSTEM

(75) Inventors: Dennis W. Eckstine, Waynesboro, PA (US); William W. Banks, New Market, MD (US)

(73) Assignee: Grove U.S. L.L.C., Shady Grove, PA (US)

( * ) Notice: Subject to any disclaimer, the term of this patent is extended or adjusted under 35 U.S.C. 154(b) by 0 days.

(21) Appl. No.: 09/205,296

(22) Filed: Dec. 4, 1998

Related U.S. Application Data
(60) Provisional application No. 60/067,815, filed on Dec. 5, 1997, and provisional application No. 60/069,055, filed on Dec. 10, 1997.

(51) Int. Cl.[7] ................................. B60Q 1/00
(52) U.S. Cl. ................. 340/436; 340/435; 340/437; 340/438; 340/943; 342/70; 180/167; 180/169
(58) Field of Search ................. 340/436, 437, 340/685, 903, 435, 942, 438, 943; 364/461, 424.05; 180/167, 168, 169, 271, 255; 342/70

(56) References Cited

U.S. PATENT DOCUMENTS

| | | | | |
|---|---|---|---|---|
| 4,723,078 A | * | 2/1988 | Neuffer et al. | 307/10 R |
| 5,061,932 A | * | 10/1991 | Tribe et al. | 342/70 |
| 5,364,205 A | * | 11/1994 | Lemelson | 404/72 |
| 5,481,248 A | | 1/1996 | Kruh | 340/685 |
| 5,519,400 A | | 5/1996 | McEwan | |
| 5,521,600 A | | 5/1996 | McEwan | |
| 5,530,651 A | * | 6/1996 | Uemura et al. | 364/461 |
| 5,581,256 A | | 12/1996 | McEwan | |
| 5,651,658 A | * | 7/1997 | Holmes et al. | 414/635 |
| 5,746,539 A | * | 5/1998 | Mara | 404/84.05 |

FOREIGN PATENT DOCUMENTS

| | | |
|---|---|---|
| CA | 1177959 A | 11/1984 |
| EP | 0367034 A | 5/1990 |
| FR | 2701278 A | 8/1994 |
| FR | 2733493 A | 10/1996 |

OTHER PUBLICATIONS

Micropower Impulse Radar (MIR) Technology Overview. Site visited Dec. 29, 1996.

* cited by examiner

Primary Examiner—Edward Lefkowitz
Assistant Examiner—Davetta W. Goins
(74) Attorney, Agent, or Firm—Birch, Stewart, Kolasch & Birch, LLP

(57) ABSTRACT

The aerial work platform including a pothole and/or obstacle avoidance system according to the present invention includes a non-contact distance measuring device mounted to an end of the aerial work platform chassis. The non-contact distance measuring device measures a distance to the ground along a predetermined angle, and generates a first signal based on the measured distance. In response to the output of the non-contact distance measuring device, a motor controller and/or brake controller of the aerial work platform control operation of a motor and/or brakes, respectively, to assist an operator of the aerial work platform in avoiding potholes and/or obstacles.

24 Claims, 1 Drawing Sheet

AERIAL WORK PLATFORM WITH POTHOLE AND/OR OBSTACLE DETECTION AND AVOIDANCE SYSTEM

This application is a continuation of both provisional applications No. 60/067,815 filed on Dec. 5, 1997 and No. 60/069,055 filed on Dec. 10, 1997.

BACKGROUND OF THE INVENTION

1. Field of the Invention

The present invention relates to an aerial work platform with a pothole and/or obstacle detection and avoidance system.

2. Description of Related Art

Conventional aerial work platforms include a wheeled chassis with a motor for driving one or more of the wheels and brakes for braking the rotation of the wheels. Typically a motor controller and a brake controller control the operation of the motor and the brakes, respectively, based on operator input. This structure allows an operator to move the aerial work platform from one location to another even while the elevating assembly (e.g., a scissors elevation assembly, boom elevation assembly, etc.) is in an elevated or non-retracted position.

Particularly, when an operator moves the aerial work platform while in an elevated state, potholes or obstacles in the path of the aerial work platform present a great danger to an operator who may be guiding the motion of the aerial work platform from the platform itself. Accordingly, a need exists to prevent the aerial work platform from encountering potholes and/or obstacles.

SUMMARY OF THE INVENTION

The aerial work platform with a pothole and/or obstacle detection and avoidance system according to the present invention includes a non-contact distance measuring device mounted on at least one end of an aerial work platform chassis. The non-contact distance measuring device measures the distance between the chassis and the ground along a predetermined angle.

In one embodiment, the non-contact distance measuring device generates a signal if the measured distance is greater than a base measurement by a first predetermined threshold wherein the base measurement represents either an empirically determined distance or the expected distance measurement between the chassis and ground when the aerial work platform is travelling over a smooth surface. Alternatively, the non-contact distance measuring device generates a signal if the measured distance exceeds a second predetermined threshold equal to the base measurement plus the first predetermined threshold.

Generation of the signal indicates the presence of a pothole, and in response to the signal the motor controller and/or brake controller stop operation of the motor and apply the brakes, respectively.

In another embodiment, the non-contact distance measuring device outputs a signal when the measured distance is less than the base measurement by a third predetermined threshold. Alternatively, the signal can be output if the measured distance exceeds a fourth predetermined threshold equal to the base measurement minus the third predetermined threshold. When the signal is output in this embodiment, an obstacle has been detected. In response to the signal the motor controller and/or brake controller will stop operation of the motor and apply the brakes, respectively.

In a further embodiment, both of the above-described embodiments are combined.

Accordingly, the aerial work platform according to the present invention assists an operator in detecting and avoiding potholes and obstacles in the path of an aerial work platform.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
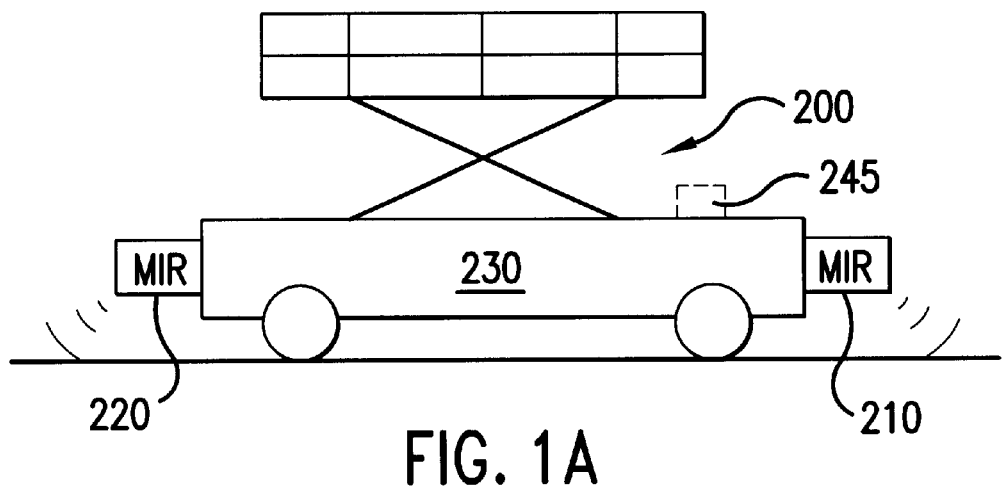
FIGS. 1A and 1B illustrate an embodiment of an aerial work platform with a pothole/obstacle detection and avoidance system for an aerial work platform according to the present invention.
Figure 1B:
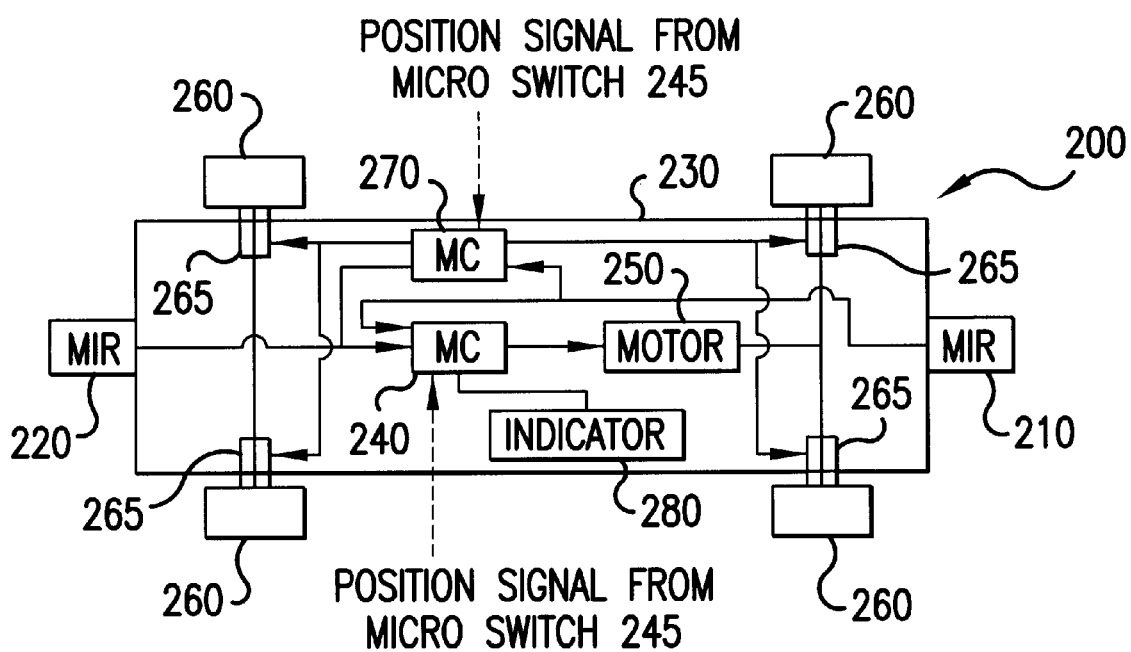

FIGS. 1A and 1B illustrate an embodiment of a pothole/obstacle detection and avoidance system for an aerial work platform according to the present invention. FIGS. 1A and 1B illustrate a scissors lift aerial work platform 200 having a first MIR system 210 disposed at one end of the chassis 230 for the aerial work platform 200 and a second MIR system 220 disposed at the other end of the chassis 230. As is well-known, MIR systems emit short-range ultra-wideband pulses, and detect the reflection of these pulses off of a body. Based on the reflected pulses, namely, the time delay between transmission and reception of the pulses, the MIR systems determine, among other things, the distance to the body.

The first and second MIR systems 210 and 220 are mounted to the chassis 230 such that their respective antennas (not shown) emit pulses towards the ground at a predetermined angle. Because the distance between the first and second MIR systems 210 and 220 and the ground (i.e., the bottom of the wheels) is known and the pulse emission angle is predetermined (i.e., known), the distance measured by the first and second MIR systems 210 and 220 when no potholes or obstacles are present is also known (ignoring variations in terrain). Hereinafter, this distance measurement will be referred to as the base measurement. Alternatively, the base measurement is empirically determined.

The first and second MIR systems 210 and 220 are calibrated to output a first warning signal when the distance measured exceeds the base measurement by a first predetermined distance (e.g., 2 or 3 inches) or a first predetermined threshold equal to the base measurement plus the first predetermined distance. The first warning signal indicates the presence of a pothole. The first and second MIR systems 210 and 220 are further calibrated to output a second warning signal when the distance measured is less than the base measurement by a second predetermined distance (e.g., 2 or 3 inches) or a second predetermined threshold equal to the base measurement minus the second predetermined distance. The second warning signal indicates the presence of an obstacle.

The first and second warning signals from the first and second MIR systems 210 and 220 are supplied to a motor controller 240 and a brake controller 270. The motor controller 240 controls the operation of a motor 250, which supplies motive force to the wheels 260 of the aerial work platform 200, based on user input (not shown). The brake controller 270 controls the operation of each brake 265 associated with the wheels 260 based on user input (not shown).

When the motor controller 240 receives either the first or second warning signal, the motor controller 240 halts operation of the motor 250 to bring the movement of the aerial work platform 200 to a halt, and activates an indicator light 280 to warn an operator. When the brake controller 270 receives either the first or second warning signal, the brake controller 270 actuates the brakes 265 to apply a braking force to the wheels 260.

The first and second MIR systems 210 and 220, in an alternative embodiment, are further calibrated to output a third warning signal when the distance measured exceeds the base measurement by a third predetermined distance (or a third predetermined threshold equal to the base measurement plus the third predetermined distance), greater than the first predetermined distance, and to output a fourth warning signal when the distance measured is less than the base measurement by a fourth predetermined distance (or a fourth predetermined threshold equal to the base measurement minus the fourth predetermined distance), greater than the second predetermined distance.

The motor controller 240 and brake controller 270, in this alternative embodiment, receive the first, second, third and fourth warning signals from the first and second MIR systems 210 and 220. The motor controller 240 and the brake controller 270 also receive a position signal indicating whether the aerial work platform is fully retracted or not. A micro switch 245, which is tripped when the aerial work platform 200 is in the fully retracted state, generates the position signal.

When the position signal indicates that the aerial work platform is not in the retracted state, the motor controller 240 stops operation of the motor 250 and the brake controller 270 actuates the brakes 265 upon receipt of either the first or second warning signal. The motor controller 240 also activates the indicator light 280.

When the position signal indicates that the aerial work platform is in the retracted state, the motor controller 240 does not stop operation of the motor 250 and the brake controller 270 does not actuate the brakes 265 upon receipt of the first or second warning signal. Instead, the motor controller 240 stops operation of the motor 250 and the brake controller 270 actuates the brakes 265 only upon receipt of 10 either the third or fourth warning signal. Also, the motor controller 240 only activates the indicator light 280 upon receipt of the third or fourth warning signal.

Instead of the motor controller 240, the brake controller 270 can activate the indicator light 280. Additionally, the motor controller 240 and the brake controller 270 can be implemented as a single controller.

A still further alternative embodiment has the MIR systems mounted to the scissors portion of the aerial work platform 200 such that they become direction focused on the ground when the aerial work platform is raised.

While the pothole/obstacle detection system for aerial work platforms according to the present invention have been described with respect to a scissors lift aerial work platform, it should be understood that the pothole/obstacle detection system applies to any type of aerial work platform.

Furthermore, instead of using MIR systems to detect the pothole or obstacle, any device which measures the distance to a body or surface without relying on contact such as sonic, ultra-sonic, infra-red and laser distance measuring devices, may be used.

While the embodiment of the present invention discussed above activates an indicator light, in addition or instead of the indicator light, warning sounds may be issued.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed:

1. An aerial work platform including a pothole and/or obstacle avoidance system, comprising:
   a chassis having wheels and a first and second end;
   an elevation assembly mounted on the chassis for lifting a load bearing member;
   a motor driving at least one of the wheels;
   at least one brake associated with at least one of the wheels for braking rotation of the wheel;
   a first non-contact distance measuring device mounted to a forward travel end of the chassis, measuring a first distance to the ground along a predetermined angle to determine the presence of potholes and/or obstacles along the ground prior to their encountering by any wheel of the chassis, the first non-contact distance measuring device generating a first signal based on the first distance;
   a motor controller controlling operation of the motor, and stopping operation of the motor in response to the first signal; and
   a brake controller controlling operation of the brake, and causing the brake to stop rotation of the associated wheel in response to the first signal.

2. The aerial work platform of claim 1, wherein the first non-contact distance measuring device is a micro-impulse radar.

3. The aerial work platform of claim 1, wherein the first non-contact distance measuring device is a sonic distance measuring device.

4. The aerial work platform of claim 1, wherein the first non-contact distance measuring device is an ultrasonic distance measuring device.

5. The aerial work platform of claim 1, wherein the first non-contact distance measuring device is an infra-red distance measuring device.

6. The aerial work platform of claim 1, wherein the first non-contact distance measuring device is a laser distance measuring device.

7. The aerial work platform of claim 1, wherein the first non-contact distance measuring device compares the first distance to a predetermined threshold, and generates the first signal when the first distance is less than the predetermined threshold.

8. The aerial work platform of claim 1, wherein the first non-contact distance measuring device determines a difference as the first distance minus a base distance, the base distance representing an expected value of the first distance when the aerial work platform travels over a substantially smooth surface, and the first non-contact distance measuring device generates the first signal when the difference is less than a predetermined threshold.

9. The aerial work platform of claim 1, wherein the first non-contact distance measuring device compares the first distance to a predetermined threshold, and generates the first signal when the first distance is greater than the predetermined threshold.

10. The aerial work platform of claim 1, wherein the first non-contact distance measuring device determines a difference as the first distance minus a base distance, the base distance representing an expected value of the first distance when the aerial work platform travels over a substantially smooth surface, and the first non-contact distance measuring device generates the first signal when the difference is greater than a predetermined threshold.

11. The aerial work platform of claim 1, wherein
the first non-contact distance measuring device generates the first signal when the first distance is less than a first predetermined threshold, and generates a second signal when the first distance is greater than a second predetermined threshold, the first predetermined threshold being less than the second predetermined threshold;
the motor controller stops operation of the motor in response to the first and second signals; and
the brake controller causes the brake to stop rotation of the wheel in response to the first and second signals.

12. The aerial work platform of claim 1, wherein
the first non-contact distance measuring device determines a difference as the first distance minus a base distance, the base distance representing an expected value of the first distance when the aerial work platform travels over a substantially smooth surface, and the first non-contact distance measuring device generates the first signal when the difference is less than a first predetermined threshold and generates a second signal when the difference is greater than a second predetermined threshold, the first predetermined threshold being less than the second predetermined threshold;
the motor controller stops operation of the motor in response to the first and second signals; and
the brake controller causes the brake to stop rotation of the wheel in response to the first and second signals.

13. The aerial work platform of claim 1, further comprising:
a retraction sensor detecting when said elevation assembly is fully retracted.

14. The aerial work platform of claim 13, wherein
the first non-contact distance measuring device generates the first signal when the first distance is less than a first predetermined threshold, and generates a second signal when the first distance is less than a second predetermined threshold which is less than the first predetermined threshold;
the motor controller stops operation of the motor in response to the first and second signals when the retraction sensor indicates that the elevation assembly is not fully retracted; and
the brake controller causes the brake to stop rotation of the wheel in response to the first and second signals when the retraction sensor indicates that the elevation assembly is not fully retracted.

15. The aerial work platform of claim 13, wherein
the first non-contact distance measuring device determines a difference as the first distance minus a base distance, the base distance representing an expected value of the first distance when the aerial work platform travels over a substantially smooth surface, the first non-contact distance measuring device generates the first signal when the difference is less than a first predetermined threshold, and generates a second signal when the first distance is less than a second predetermined threshold, which is less than the first predetermined threshold;
the motor controller stops operation of the motor in response to the first and second signals when the retraction sensor indicates that the elevation assembly is not fully retracted; and
the brake controller causes the brake to stop rotation of the wheel in response to the first and second signals when the retraction sensor indicates that the elevation assembly is not fully retracted.

16. The aerial work platform of claim 13, wherein
the first non-contact distance measuring device generates the first signal when the first distance is greater than a first predetermined threshold, and generates a second signal when the first distance is greater than a second predetermined threshold which is greater than the first predetermined threshold;
the motor controller stops operation of the motor in response to the first and second signals when the retraction sensor indicates that the elevation assembly is not fully retracted; and
the brake controller causes the brake to stop rotation of the wheel in response to the first and second signals when the retraction sensor indicates that the elevation assembly is not fully retracted.

17. The aerial work platform of claim 13, wherein
the first non-contact distance measuring device determines a difference as the first distance minus a base distance, the base distance representing an expected value of the first distance when the aerial work platform travels over a substantially smooth surface, the first non-contact distance measuring device generates the first signal when the difference is greater than a first predetermined threshold, and generates a second signal when the first distance is greater than a second predetermined threshold, which is greater than the first predetermined threshold;
the motor controller stops operation of the motor in response to the first and second signals when the retraction sensor indicates that the elevation assembly is not fully retracted; and
the brake controller causes the brake to stop rotation of the wheel in response to the first and second signals when the retraction sensor indicates that the elevation assembly is not fully retracted.

18. The aerial work platform of claim 14,
the first non-contact distance measuring device generates a third signal when the first distance is greater than a third predetermined threshold, and generates a fourth signal when the first distance is greater than a fourth predetermined threshold which is greater than the third predetermined threshold;
the motor controller stops operation of the motor in response to the third and fourth signals when the retraction sensor indicates that the elevation assembly is fully retracted; and
the brake controller causes the brake to stop rotation of the wheel in response to the third and fourth signals when the retraction sensor indicates that the elevation assembly is fully retracted.

19. The aerial work platform of claim 15, wherein
the first non-contact distance measuring device generates a third signal when the difference is greater than a first predetermined threshold, and generates a fourth signal when the first distance is greater than a fourth predetermined threshold, which is greater than the third predetermined threshold;

the motor controller stops operation of the motor in response to the third and fourth signals when the retraction sensor indicates that the elevation assembly is fully retracted; and the brake controller causes the brake to stop rotation of the wheel in response to the third and fourth signals when the retraction sensor indicates that the elevation assembly is fully retracted.

20. The aerial work platform of claim 1, further comprising:

a second non-contact distance measuring device mounted to the second end of the chassis measuring a second distance to the ground along a predetermined angle when said second end is the forward travel end, and generating a second signal based on the second distance; and wherein the motor controller stops operation of the motor in response to the first and second signals; and the brake controller causes the brake to stop rotation of the wheel in response to the first and second signals.

21. The aerial work platform of claim 1, further comprising:

an indicator; and wherein the motor controller drives the indicator in response to the first signal.

22. An aerial work platform including a potholes avoidance system, comprising:

a chassis having wheels and a first and second end;

a lift structure mounted on the chassis for lifting a load bearing member;

a motor driving at least one of the wheels;

at least one brake associated with at least one of the wheels for braking rotation of the wheel;

a first non-contact distance measuring device mounted to the first end of the chassis, measuring a first distance to the ground along a predetermined angle to determine the presence of potholes and/or obstacles along the ground prior to their encountering by any wheel of the chassis, the first non-contact distance measuring device generating a first signal based on the first distance; and a brake controller controlling operation of the brake, and causing the brake to stop rotation of the associated wheel in response to the first signal.

23. An aerial work platform including a pothole avoidance system, comprising:

a chassis having wheels and a first and second end;

a lift structure mounted on the chassis for lifting a load bearing member;

a motor driving at least one of the wheels;

at least one brake associated with at least one of the wheels for braking rotation of the wheel;

a first non-contact distance measuring device mounted to the first end of the chassis, measuring a first distance to the ground along a predetermined angle to determine the presence of potholes and/or obstacles along the ground prior to their encountering by any wheel of the chassis, the first non-contact distance measuring device generating a first signal based on the first distance; and a motor controller controlling operation of the motor, and stopping operation of the motor in response to the first signal.

24. An aerial work platform, comprising:

a chassis having wheels and a first and second end;

a lift structure mounted on the chassis for lifting a load bearing member;

a motor driving at least one of the wheels;

at least one brake associated with at least one of the wheels;

a surface defect detecting device detecting the presence of potholes and/or obstacles along the surface which said aerial work platform travels prior to their encountering by any wheel of the chassis; and a controller controlling at least one of said motor and said brake based on output of said surface defect detecting device.

* * * * *